(12) United States Patent
Narvaez-Guarnieri et al.

(10) Patent No.: US 6,347,078 B1
(45) Date of Patent: Feb. 12, 2002

(54) MULTIPLE PATH ROUTING

(75) Inventors: Paolo Narvaez-Guarnieri, Middlesex; Kai-Yeung Siu, Boston, both of MA (US); Hong-Yi Tzeng, Monmouth, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/132,032

(22) Filed: Aug. 11, 1998

Related U.S. Application Data

(60) Provisional application No. 60/056,028, filed on Sep. 2, 1997.

(51) Int. Cl.[7] ........................... H04L 12/56; G06F 13/00
(52) U.S. Cl. .................... 370/230; 370/238; 370/406; 709/105; 709/241
(58) Field of Search .................. 370/230, 231, 370/235, 238, 252, 389, 400, 248, 406, 232; 709/238, 239, 241, 105

(56) References Cited

U.S. PATENT DOCUMENTS

| | | | | |
|---|---|---|---|---|
| 5,142,531 A | * | 8/1992 | Kirby | 370/400 |
| 5,317,566 A | * | 5/1994 | Joshi | 370/400 |
| 5,537,392 A | * | 7/1996 | Willie et al. | 370/248 |
| 5,825,772 A | * | 10/1998 | Dobbins et al. | 370/401 |
| 5,881,243 A | * | 3/1999 | Zaumen et al. | 395/241 |

FOREIGN PATENT DOCUMENTS

EP 0465090A A1 1/1992

OTHER PUBLICATIONS

Richard G. Ogier & Vlad Rutenberg, "Efficient Algorithms for Optimal Alternate Routing in Communication Networks" 676–680 (May 23, 1993) XP000371172.

* cited by examiner

Primary Examiner—Hassan Kizou
Assistant Examiner—Afsar M. Qureshi

(57) ABSTRACT

A novel data structure in a router helps to compute viable next hops for forwarding a data packet from a router to its destination along multiple alternate loop-free paths, which are not necessarily of shortest distance. Each viable next hop may also be specified with a degree of optimality, which enables a route to perform QoS routing and fault-tolerant routing efficiently. The data structure can be implemented as an add-on software to existing routing protocols and may be implemented in existing networks which use shortest path protocols, even where less than all of the routers use the data structure and multiple path scheme described herein.

6 Claims, 3 Drawing Sheets

| SHORTEST DISTANCE FROM ROUTER S TO NODE X | HOP A | w(S,A) | $d_A(S,X)$ |
| --- | --- | --- | --- |
| | HOP B | w(S,B) | $d_B(S,X)$ |
| | HOP C | w(S,C) | $d_C(S,X)$ |
| | HOP D | w(S,D) | $d_D(S,X)$ |
| | ⋮ | ⋮ | ⋮ |

| SHORTEST DISTANCE ROUTER S TO NODE X | NEXT HOP | PARENT OF X |
| --- | --- | --- |
| 210 | 220 | 230 |

MULTIPLE PATH ROUTING

RELATED APPLICATIONS

This application claims the benefit of provisional U.S. patent application Ser. No. 60/056,028 filed Sep. 2, 1997.

FIELD OF THE INVENTION

The present invention relates generally to routing data packets to a destination node within a packet switching network. In particular the invention relate to a multiple path routing scheme using a novel data structure.

BACKGROUND OF THE INVENTION

In packet switching networks such as the Internet, a packet from a source traverses intermediate network routers before reaching its destination. Before a packet arrives at a router, a routing protocol is used to determine the existence and status of all routers and links therebetween on the network. This information is used by the router to determine an appropriate next hop for an arriving packet with a given destination. The next hop includes the next router along the path to the destination and the outgoing port of the present router linking the next router. A widely used link-state routing protocol, is Open Shortest Path First ("OSPF")

Given the current link states in the network, (e.g. reduced bandwidth, increased bandwidth, disconnected, reconnected) each router S keeps track of a shortest path tree "SPT" from S to every other router in the network. Since the router retains only one shortest path from S for each destination router, the first hop from S along this path will be used as the next hop to forward any packets with the same given destination.

Although a router using OSPF has global information about the regional network topology, it determines only the local route of a packet, i.e., the next hop. When each router computes such next-hop information based on an SPT, each packet is guaranteed to be forwarded along a loop-free path to its destination. A loop-free path is a path that doesn't include the same router more than once. Multiple SPTs rooted at router S can co-exist in a network. In such a case there are multiple choices of next hops from S to forward a packet, each of which will lead to a different path of the same shortest distance. The packet can be forwarded to any of these next hops.

Routing protocols allowing for only a single shortest path suffer from several inefficiencies. For example, if immediately before dispatching a packet along its next hop, a router learns that a link along the path is down, the router must first recompute a new single shortest path and only then send the packet along the new next hop.

The single shortest path method also ignores network load considerations. Thus, even if a path has a lot of traffic the packet will be forwarded along that path if it is the shortest to its destination. Furthermore, it is known that finding an optimal path that satisfies certain QoS constraints is in general computationally difficult (NP-complete). Since some QoS parameters that need to be optimized may depend on the network traffic load and thus can change dynamically over a short period of time, finding an optimal path can become infeasible even for a moderate-size network. Even for QoS parameters that do not change frequently, determining the optimal path from a router may require global knowledge of these parameters in the network, and a local change in these parameters would therefore need to be disseminated to every node in the network. Hence in most cases only suboptimal paths can be computed.

SUMMARY OF THE INVENTION

The present invention uses a multiple path algorithm (referred to herein as "MPA") to enable a router to forward packets to multiple viable next hops that are not strictly constrained to be a part of a shortest path from the router to the packet's destination. The method of the present invention still guarantees, however, that all packets will be routed to their destination on loop-free paths. In general each path traversing a different next hop is guaranteed to be loop free if it satisfies the constraint that the shortest distance from the implementing router to the destination decreases at each next hop.

In a preferred embodiment of the invention, the MPA uses a novel data structure which stores information relating to each router (node) in the network that is a potential destination node. In particular, the data structure maintains at least the following attributes: the shortest distance from the implementing router to the destination node; the cost of each link from the implementing router to each potential next hop; and for each potential next hop, the shortest distance from the implementing router to the destination node along a path traversing that particular next hop.

Using this data structure, multiple viable next hops are computed by selecting next hops from the potential next hops whose shortest distance attribute traversing that next hop, minus the cost of the link from the implementing router to the next hop, is less than the shortest path from the implementing router to the destination node.

The method and data structure of the present invention can be efficiently implemented as an add-on component to existing routing protocols such as OSPF. Each MPA implementing router uses the topology information exchanged by the router protocols to compute multiple paths between a given source and a given destination. Moreover, conventional routers based on shortest path routing can co-exist in the same network with MPA implementing routers to guarantee loop-free routing for each packet. In general, an MPA implementing router can interoperate with any router whose routing protocol uses the loop-free policy.

By maintaining multiple viable next hops in a router for each destination, recovery from link failure is much faster than heretofore possible, since the recovery mechanism using alternate paths can be implemented locally by the router, and there is almost no delay incurred by the link failure. On the other hand, without MPA, after detecting a link failure, the router would need to broadcast throughout the network the link failure, then recompute the shortest path tree to determine a new alternative path.

DETAILED DESCRIPTION OF THE INVENTION

The packet routing method of the present invention involves making available at each router, alternative multiple next hops to forward a received packet. The only constraint in computing the multiple next hops is that the paths to the packet's destination resulting from these next hops do not return the packet to any router it previously hit. In other words, the paths of these alternative next hops should be loop free. As discussed above, the OSPF protocol well known in the art, guarantees loop-free routing to each destination by constraining each router to choose the next hop based on an SPT. However, a loop free path can be guaranteed even if it does not represent the shortest distance to a destination. For example, any path to a destination that traverses a particular next hop from a router S is loop free if the distance to the destination continues to decrease at each next hop.

In one preferred embodiment of the present invention viable next hops from a router S, i.e., next hops which lie on a loop free path to a destination, can be guaranteed where the shortest distance from S to the destination traversing a given next hop, minus the cost of the link (i.e., its distance) from S to that next hop is less than the absolute shortest distance from S to the destination. For example, if router R is the next hop from router S along a shortest path from S to destination router D, then the distance between R and D, i.e., d(R, D), must be less than the distance from S to D, i.e., d(S, D). Extrapolating R to any next router $R_i$, which can even be a router not on the absolute shortest path between S and D, a loop free path from S to D is guaranteed with a next hop to $R_i$ if $d(R_i, D) < d(S, D)$.

Figure 4:
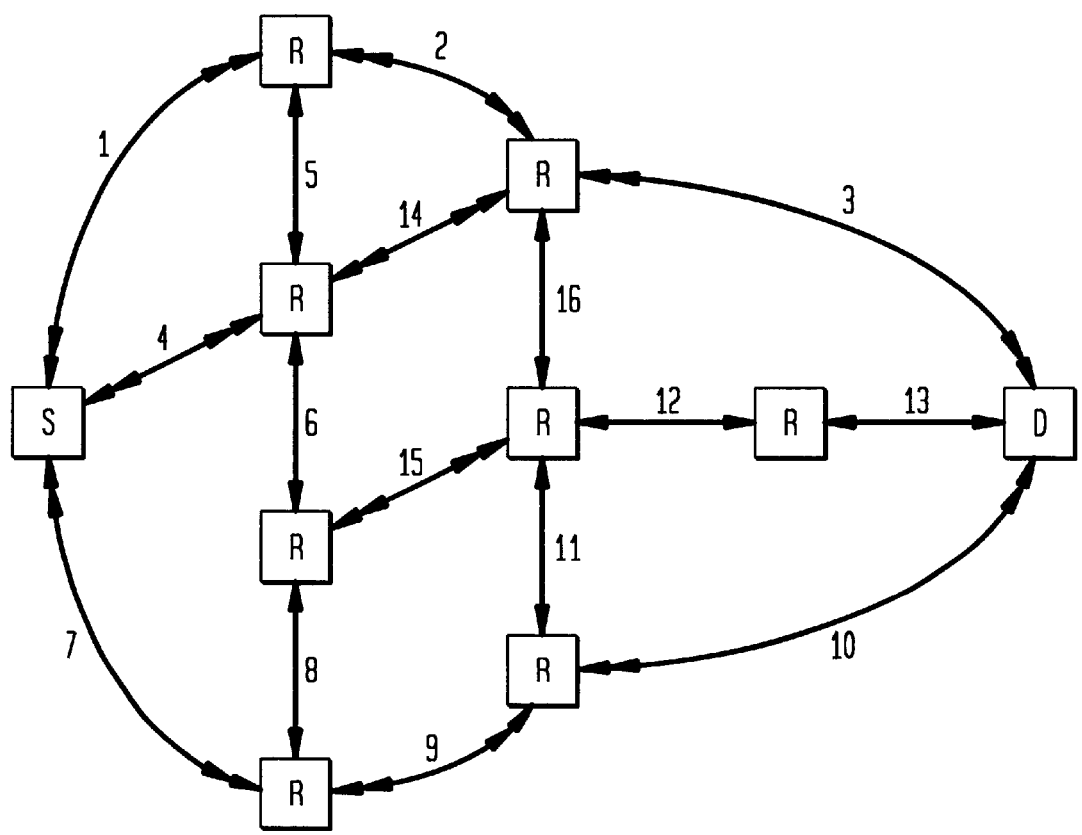
FIG. 4 is a representation of a network of routers including a source router S and a destination router D.

Referring to FIG. 4 an example of a network of routers is shown, including source router S, destination router D and a plurality of routers R. Each link between the routers is numbered and it is assumed that each link has the same cost, or distance. In this example, it is clear that there are three shortest paths: (i) 1-2-3; (ii) 7-9-10; and (iii) 4-14-3.

However, in addition to these shortest paths, there are at least twenty four loop free paths. In particular, 1-5-6-14-3; 1-5-6-15-16-3; 1-5-6-15-12-13; 1-5-6-8-9-10; 1-5-6-8-9-11-16-3; 1-5-6-8-9-11-12-13; 4-5-2-3; 4-6-15-16-3; 4-6-15-12-13; 4-6-15-11-10; 4-6-8-9-10; 4-6-8-9-11-16-3; 4-6-8-9-11-12-13; 7-9-11-16-3; 7-9-11-12-13; 7-8-15-16-3; 7-8-15-11-10; 7-8-15-12-13; 7-8-6-14-3; 7-8-6-14-16-12-13; 7-8-6-14-16-11-10; 7-8-6-5-2-3; 7-8-6-5-2-16-11-10; 7-8-6-5-2-16-12-13. A non-viable loop path, however, exists for example on path 7-8-6-5-2-16-15 . . . since link 15 will return the packet to a router previously visited between links 8 and 6.

Figures 1, 2:
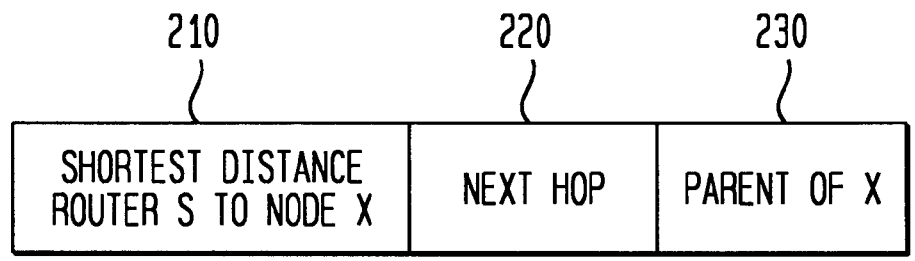
FIG. 1 is a graphical depiction of the data structure used in accordance with the present invention.
FIG. 2 is a graphical depiction of the data structure used in a conventional shortest path tree algorithm.

In the preferred embodiment of the invention, the MPA of the present invention makes use of the data structure of FIG. 1 to compute alternate viable next hops from a router whose shortest distances to the destination are less than the shortest distance from the router to the destination.

During execution, a conventional SPT algorithm usually keeps track of certain state information about each node in the network. See E. Dijkstra, "A Note to Two Problems in Connection with Graphs" Numerical Mathematics, vol. 1 p. 115–126 (1959); R. Bellman, "On a Routing Problem" Quarterly of Applied Mathematics, vol. 16, p. 87–90 (1958), hereby incorporated by reference as if fully set forth herein. Typically, such information consists of a distance attribute 210, the next hop attribute from the router 220, and perhaps a parent attribute for each node 230, as shown in FIG. 2. At each hop, during the execution of the SPT algorithm in router S, the distance attribute 210 of destination node X represents the distance of the shortest path found so far from the router S to node X, while the next hop attribute and the parent attribute respectively identify the first hop from router S and the last hop to router S.

The data structure of FIG. 1, however, contains more state information about each node in the network, without incurring significant computational complexity. More specifically, a given router S will maintain for each destination node X the shortest distance d(S, X) from the router S to X. This information can be computed with existing SPT algorithms such as those taught in Dijkstra and Bellman, supra. In addition, the distance, or cost w(S,p) for each outgoing link connecting the router S to a potential next hop p is also maintained. Furthermore, the data structure keeps track of the length of the shortest path that uses p as the next hop from S, which is denoted by $d_p(S, X)$. When the MPA execution terminates, $d_p(S, X)$ should equal the sum of w(S,P) and the shortest distance found, d(p, X) from p to X. By maintaining this data structure, the MPA identifies viable next hops for destination X using the principles discussed above: namely a viable path using next hop p exists if $d_p(S, X) - w(S, p) < d(S, X)$.

While all next hops satisfying the above inequality are viable and can be revealed by the MPA, it is possible for additional viable next hops to exist which will not be revealed. By searching through paths, the data structure at every node can be updated, increasing the number of viable next hops. As long as the shortest distance to every node is computed correctly, the resulting viable next hops will not lead to a loop.

With the alternative viable paths for a given destination, alternate paths can be constructed by comparing the MPA data structures associated with different destinations. Most SPT algorithms known in the art constantly compare the distance attributes of two neighboring nodes. The distance attribute of a node eventually converges to the shortest distance from the source to that node. The distance attribute of node X from source S computed by the SPT algorithm is contained in the corresponding field 210 of the shortest distance from S to X and is updated by the SPT algorithm, independently of other operations of the MPA.

Figure 3:
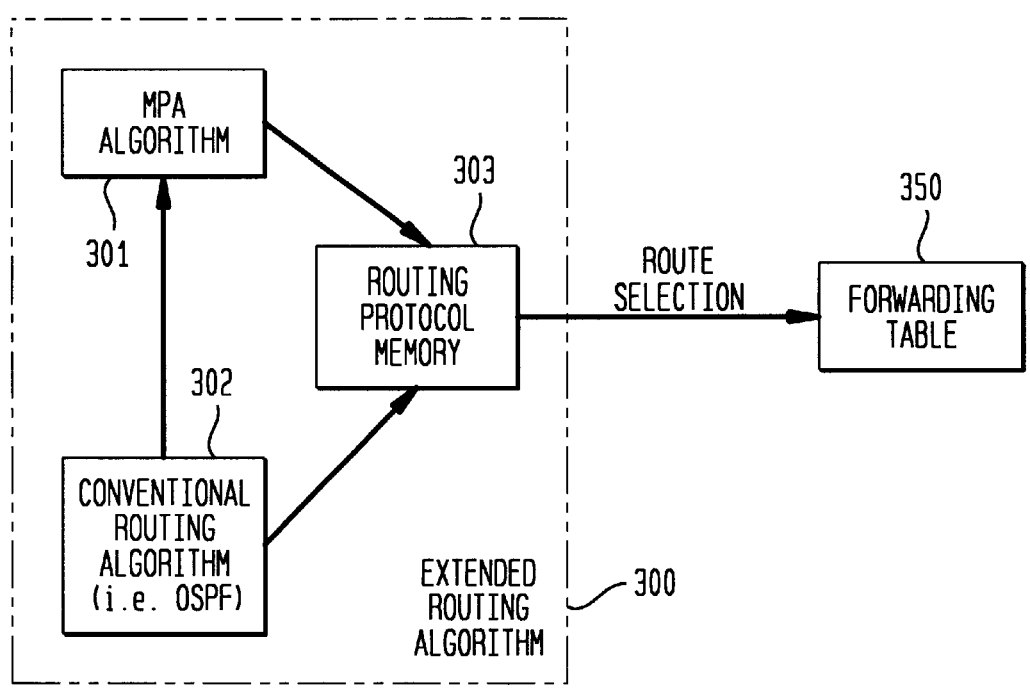
FIG. 3 depicts a router architecture employing the MPA algorithm as used in accordance with the present invention.

Referring to FIG. 3, the extended routing algorithm 300 in accordance with the present invention comprises these modules: MPA Algorithm 301, Conventional Routing Algorithm 302 and Routing Protocol Memory 303. The MPA and Conventional Algorithms 301 and 302, respectively, while possible to be implemented with hardware, typically comprise software executed on a standard microprocessor having the computing power of at least a Power PC or Pentium grade chip. Routing Protocol Memory 303 typically comprises at least 4 megabytes ("MB") of RAM, with 3 MB typically allocated to the Conventional Algorithm 302 and 1 MB allocated to the MPA Algorithm. Furthermore, it is possible to provide physically separate RAM chips for use by each of the algorithms 301 and 302. Forwarding Table 350 also typically comprises at least 4 MB of RAM.

Every time the SPT algorithm, represented by block 302, makes a comparison between nodes a and b, the distance attribute from source S to b, $d_{opt}(b)$, is equal to the smaller values between its old value and the sum of $d_{opt}(a) + w(a, b)$.

Furthermore, with each comparison by the SPT algorithm 302 between nodes a and b, MPA block 301 is triggered and starts its own comparisons. For every next hop p from S, the distance from S to b is set to the minimum of its old value and $d_p(S, a) + w(a, b)$. With the termination of the SPT algorithm, the MPA also terminates and the data structure is updated in routing protocol memory 303.

With the availability of viable next hops the router can select the actual next hop for forwarding a packet based on a variety of criteria such as round robin, network load, or shortest distance. Those skilled in the art will be able to devise various selection criteria.

Indeed, one such criteria can be used to determine satisfactory approximate solutions to QoS routing by decoupling the underlying optimization problem discussed above, into local and global computations. First, multiple viable paths that satisfy the global or less frequently changed QoS constraints are computed. Then among these viable paths, one that is optimized with respect to the local or more frequently changed QoS parameters can be determined.

With respect to load balancing it should be noted that implementation of such a scheme may require a means to preserve the FIFO arrival of packets where FIFO is assumed by the upper layer protocol at the destination router. It may also be necessary to provide additional buffer means and processing capabilities at the destination router, especially where FIFO is not strictly adhered to.

In addition each router can compute and store in a forwarding table such as 350 in FIG. 3, each viable next hop for a given destination or maintain only a single viable next hop in forwarding table 350 while maintaining additional next hop information in the routing protocol memory 303.

By maintaining multiple viable next hops in a router for each destination, recovery from link failure is much faster than heretofore possible, since the recovery mechanism using alternate paths can be implemented locally by the router, and there is almost no delay incurred by the link failure. On the other hand, without MPA, after detecting a link failure, the router would need to broadcast throughout the network the link failure, then recompute the shortest path tree to determine a new alternative path.

A more exhaustive search of alternate next hops can be obtained by running a set of independent SPT algorithms in parallel. For every next hop $p_i$ any SPT algorithm including a dynamic algorithm, i.e., an algorithm which can compute a new SPT by readjusting the old SPT, is executed using only the distance attribute $d_p(S,X)$ in the data structure associated with the destination X. (While a static algorithm recomputes an entire shortest path, a dynamic algorithm recognizes that the majority of the path segments will remain the same and therefore only certain segments are recomputed). After the SPT algorithm is executed, the data structure is updated and all of the next hops $p_i$ that satisfy the above inequality are obtained.

The foregoing merely illustrates the principles of the present invention. Those skilled in the art will be able to devise various modifications, which although not explicitly described or shown herein, embody the principles of the invention and are thus within its spirit.

What is claimed is:

1. A method for routing a data packet from an implementing router to a destination node in a packet switching network, said data packet originally from a source node in said packet switching network, said method comprising the steps of:

A. determining and storing in a data structure: the shortest distance from the implementing router to the destination node, the cost of each link from the implementing router to each potential next hop; for each of said potential next hop, the shortest distance from the implementing router to the destination node along a path traversing that particular next hop;

B. storing said data structure in a first memory means at said implementing router;

C. using said data structure to compute multiple viable next hops from the implementing router, each of said viable next hops lying on a path from said source to said destination node, by selecting next hops from the potential next hops whose shortest distance attribute traversing that next hop minus the cost of the link form the implementing router to the next stop is less than the shortest path from the implementing router to the destination node;

D. selecting the optimal of said one or more viable next hops to forward said data packet;

E. upon the failure of forwarding said data packet via the selected next hop, removing the selected next hop from list of viable next hops and repeating step D until the data packet is successfully forwarded to next hop.

2. A method according to claim 1 wherein each of said viable next hops are in a path from said destination whose shortest distance is less than the absolute shortest distance from said source node to said destination node.

3. A method according to claim 1 wherein each of said viable next hops leads to a loop free path from said source node to said destination node, but is not constrained to lead to a shortest path between said source node and said destination node.

4. A method according to claim 1 wherein said selecting steps are constrained to select a viable next hop leading to the shortest path as compared with all of said one or more viable next hops stored in said first memory means.

5. A method for determining multiple loop free paths from a source node to a destination node in a packet switching network, said packet switching network comprising a plurality of routers, said method comprising the step of selecting at each of said routers next hops from potential next hops whose shortest distance attribute traversing that next hop, minus the cost of the link from the source node to the next hop, is less than the shortest path from the source node to the destination node.

6. A router for use in a packet switching network for routing a data packet originating from a source node, to a destination node, comprising:

storage means for a data structure, said date structure comprising; the shortest distance from said router to a destination node, the distance to each next hop from said router; and for each of said next hops, the distance of the shortest path from said router to said destination node using said next hop; and computer implemented means for determining one or more viable next hops from said data structure, by selecting next hops from potential next hops whose shortest distance attribute traversing that next hop minus the cost of the link form the implementing router to the next stop is less than the shortest path from the implementing router to the destination node.

* * * * *